US009106628B2

(12) United States Patent
Kolesnikov et al.

(10) Patent No.: US 9,106,628 B2
(45) Date of Patent: Aug. 11, 2015

(54) EFFICIENT KEY MANAGEMENT SYSTEM AND METHOD

(75) Inventors: Vladimir Kolesnikov, Jersey City, NJ (US); Vijay Gurbani, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1299 days.

(21) Appl. No.: 12/459,717

(22) Filed: Jul. 7, 2009

(65) Prior Publication Data

US 2011/0010549 A1 Jan. 13, 2011

(51) Int. Cl.
*H04L 29/06* (2006.01)
*H04L 9/08* (2006.01)

(52) U.S. Cl.
CPC .............. *H04L 63/061* (2013.01); *H04L 9/083* (2013.01); *H04L 63/18* (2013.01); *H04L 65/105* (2013.01); *H04L 65/1006* (2013.01); *H04L 2209/76* (2013.01)

(58) Field of Classification Search
CPC .... H04L 63/061; H04L 65/1006; H04L 63/06
USPC .......................................................... 713/171
See application file for complete search history.

(56) References Cited

U.S. PATENT DOCUMENTS

| | | | | |
|---|---|---|---|---|
| 5,907,618 | A * | 5/1999 | Gennaro et al. | 380/286 |
| 6,658,114 | B1 * | 12/2003 | Farn et al. | 380/277 |
| 6,879,690 | B2 * | 4/2005 | Faccin et al. | 380/247 |
| 7,590,860 | B2 * | 9/2009 | Leporini et al. | 713/185 |
| 8,024,560 | B1 * | 9/2011 | Alten | 713/156 |
| 8,307,208 | B2 * | 11/2012 | Matsuo | 713/171 |
| 8,611,338 | B2 * | 12/2013 | Lawson et al. | 370/352 |
| 8,837,725 | B2 * | 9/2014 | Teruyama | 380/255 |
| 2003/0026428 | A1 * | 2/2003 | Loisel | 380/277 |
| 2005/0195975 | A1 * | 9/2005 | Kawakita | 380/30 |
| 2006/0182124 | A1 * | 8/2006 | Cole et al. | 370/395.54 |
| 2006/0190726 | A1 * | 8/2006 | Brique et al. | 713/168 |
| 2007/0076879 | A1 * | 4/2007 | Asokan et al. | 380/255 |
| 2008/0044014 | A1 * | 2/2008 | Corndorf | 380/37 |
| 2008/0098228 | A1 * | 4/2008 | Anderson et al. | 713/172 |
| 2008/0183992 | A1 * | 7/2008 | Martin et al. | 711/162 |
| 2009/0113203 | A1 * | 4/2009 | Tsuge et al. | 713/151 |

OTHER PUBLICATIONS

Hilt, V., Mankin, A., Hofmann, M., "A Framework for SIP Session Policies", Bell Labs Technical Journal, 2004.*

(Continued)

*Primary Examiner* — Mohammad L Rahman
(74) *Attorney, Agent, or Firm* — Patti & Malvone Law Group, LLC

(57) ABSTRACT

A system for providing cost effective, secure key exchange from at least one first device to at least one second device through at least one proxy server is provided. The system includes a first key exchange message from the at least one first device to the at least one second device via the at least one proxy server. A second key exchange message from the at least one second device to the at least one first device via a media stream of the Internet is required to complete the computation of the session key. A method of securing a communication system is also set forth. The method includes the steps of providing a routing device for identifying a subscriber, and providing a master key exchange session, the master key exchange session including a key k to find a subscriber and a nonce r to answer a query to the subscriber, wherein the master key exchange session includes both the key k and the nonce r.

21 Claims, 2 Drawing Sheets

(56) References Cited

OTHER PUBLICATIONS

Prateek Gupta et al.; Security Analysis of Voice-Over-IP Protocols; Computer Security Foundations Symposium; Jul. 2007, pp. 49-63, 20th IEEE, IEEE, PI.

Wing D et al.; Requirements and Analysis of Media Security Management Protocols; Internet Engineering Task Force, IETF; Standard Internet Society, Geneva Switzerland, Apr. 2009, p. 8-11, p. 15, p. 24.

* cited by examiner

Session Setup in SIP
PRIOR ART

EFFICIENT KEY MANAGEMENT SYSTEM AND METHOD

TECHNICAL FIELD

This invention relates generally to an efficient key management system and method, and more particularly to a key management system suitable for use in Session Initiation Protocol (SIP).

BACKGROUND

Long gone are the days of telephone party lines, used in the early days of telephone operations. Party lines made life interesting. Numerous users of telephones in their homes could selectively eaves drop on the conversations of others. Examples of party line activity have been presented extensively in movies, novels, and comedy skits, due to the unpredictable and undesirable characteristics of shared communication. The telephone industry worked hard to bring important improvements to telephone usage, such as the private phone line. Privacy in communications has become a highly valued concern of consumers. As communication has expanded beyond the phone line and into the virtual world of the Internet, a whole new set of complex problems are introduced in trying to facilitate private communication in a cost effective manner.

Private communication via network environments, such as the Internet, can be difficult to achieve. Current efforts include using, for example, Session Initiation Protocol (SIP) to effectively exchange keys while providing desirable aspects of the protocol, such as forking, re-targeting, request recursion, etc. and reducing undesirable aspects, such as exchanging keys with unintended parties, voice clipping, etc.

SIP is a rendezvous protocol for the Internet that was published as an Internet Engineering Task Force (IETF) standard in 1999, and further revised in June 2002. SIP uses well-know email-like identifiers to represent users, instead of using numeric identifiers. SIP is a text-based request-response protocol. An SIP environment includes user agents, proxy servers, redirect servers, and registrars. SIP user agents provide software programs that enable the rendezvous protocol when executed on a suitable electronic device, such as a computer, Internet phone, personal digital assistant (PDA), or any other suitable electronic device for transmitting and receiving media over an Internet connection.

Two types of SIP user agents are provided. The first type is a user agent client (UAC), which originates requests, such as, for example, a request to start a multimedia session. The second type is a user agent server (UAS), which accepts and acts upon a request from the UAC. Typically, a UAS will register with a registrar. Once registered, the current IP address of the UAS is bound to an email-like identifier. The email-like identifier is used to identify the UAS. SIP proxy servers use the UAS email-like identifier to route requests to a particular UAS from a UAC.

SIP proxy servers are intermediaries that provide critical services for SIP sessions, such as routing, authentication, and forking (creating a search tree in SIP). For example, a request to establish a session or INVITE is routed to a downstream UAS via a proxy server. The downstream UAS sends one or more provisional responses to the INVITE followed by exactly one final response. The responses traverse from the UAS to the UAC in reverse order over the same proxy chain as the request. A session is established when a UAC receives a final response from a UAS and sends out a new request known as an ACK. The ACK and any subsequent requests can flow directly from UAC to UAS, or vice versa, depending on the policy of the proxy server. Some proxies may choose to stay in the session such that all subsequent requests flow through them as illustrated, for example, in FIG. 1, as discussed below. However, media between UAC and UAS flows directly without being routed through one or more SIP proxy servers, as illustrated in FIG. 1. In other words, the SIP protocol is used to establish an initial rendezvous, whereas a different media stream with a different protocol is used for the exchange between UAC and UAS once the rendezvous is established. Because the protocols are different, providing security for the system as a whole is challenging.

Known key distribution protocols that attempt to address the security challenge of the system include, for example, ZRTP and DTLS-SRTP. DTLS-SRTP provides a reasonably strong security against attackers, and uses public-key infrastructure (PKI) which is both fiscally and computationally costly, ie several public key operations are required. ZRTP is a complex key distribution protocol with reasonable security. However, it is both expensive to implement and has subtle vulnerabilities.

Thus, known keying protocols, public and private have inherent drawbacks, such as cost and complexity, for SIP sessions.

SUMMARY

A system for providing cost effective, secure key exchange from at least one first device to at least one second device through at least one proxy server is provided. The system includes a first key exchange message from the at least one first device to the at least one second device via the at least one proxy server. A second key exchange message from the at least one second device to the at least one first device via a media stream of the Internet is required to complete the computation of the session key. A method of securing a communication system is also set forth. The method includes the steps of providing a routing device for identifying a subscriber, and providing a master key exchange session, the master key exchange session including a key k to find a subscriber and a nonce r to answer a query to the subscriber, wherein the master key exchange session includes both the key k and the nonce r.

DESCRIPTION OF THE DRAWINGS

Features of example implementations of the invention will become apparent from the description, the claims, and the accompanying drawings in which:

DETAILED DESCRIPTION

Figure 1:
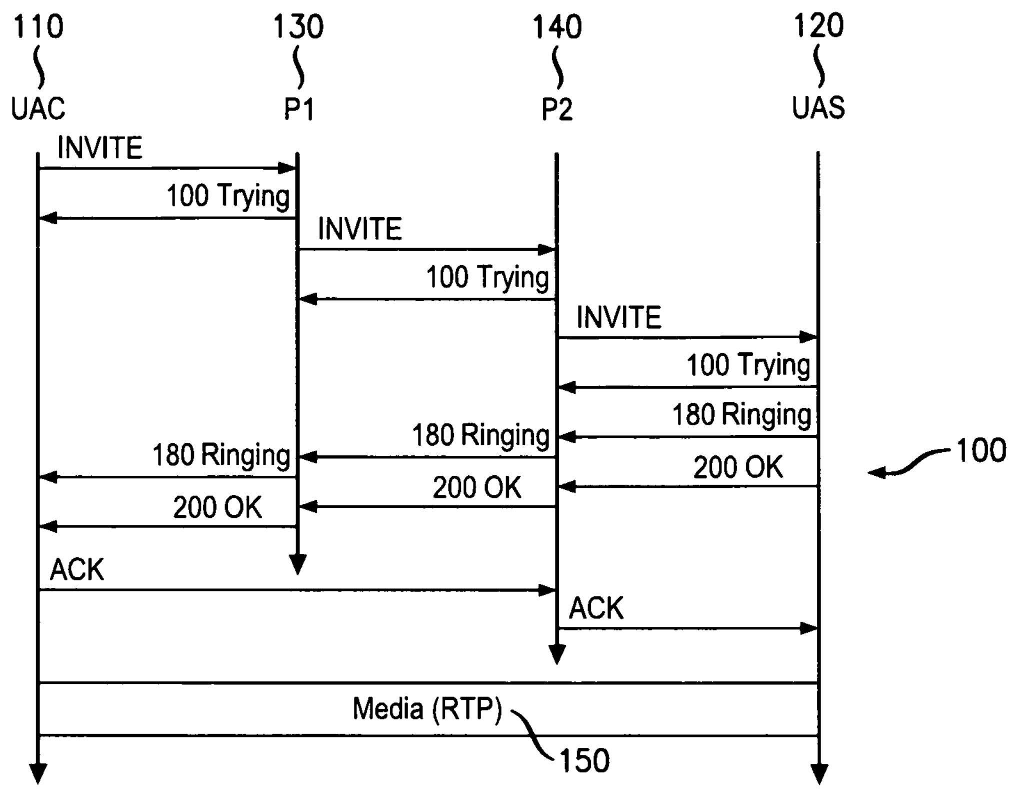
FIG. 1 is a background diagram for a session setup 100 using SIP.

FIG. 1 is a background diagram for a session setup 100 using SIP. The session setup 100 is the same for all keying protocols adapted and constructed for SIP rendezvous protocol usage. The setup 100 includes UAC 110, UAS 120, proxies P1 130, P2 140, and a media stream (RTP) 150. Some proxies may choose to stay in the session such that all subsequent requests flow through them as illustrated, for example, by P2 140 in FIG. 1, where P2 receives the ACK request from the UAC. However, media between UAC and UAS flows directly along the RTP 150, without being routed through one or more SIP proxy servers, as illustrated in FIG. 1. RTP poses security issues. As a result Secure RTP, or SPTR has been developed to provide confidentiality, message authentication, and replay protection to the RTP traffic. Widespread use of SRTP in SIP has been hindered due to ineffective keying protocols. In other words, various keying protocols have been unable to negotiate security contexts, ie., cryptographic keys and parameters, while preserving important SIP features.

Figure 2:
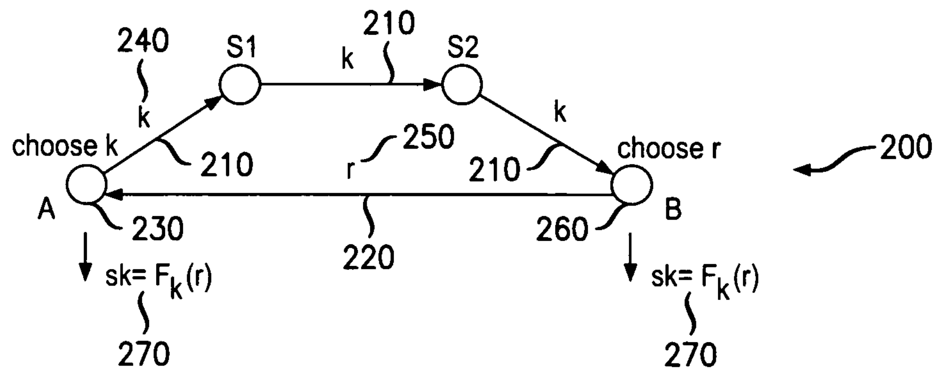
FIG. 2 is a diagram depicting an exemplary arrangement 200 of an advantageous key management system adapted for use in a rendezvous protocol, such as the session setup 100 using SIP of FIG. 1.

As illustrated in FIG. 2, an exemplary arrangement 200 of an advantageous key management system adapted for use in a rendezvous protocol, such as the session setup 100 using SIP of FIG. 1, that provides a cost effective keying system, or protocol is provided. The system employs a signaling layer 210, and a media layer 220. An initiator A, or Alice operates a first terminal 230 and selects a random key k 240 to send to B, or Bob via the signaling layer, here via an SIP framework. The random key k 240 is not the session key. Instead, Bob receives the random key k 240 and then chooses a random nonce r 250. Bob then sends the random nonce r back, in plaintext via a second terminal 260, to Alice together with the media stream, or layer 220. A session key, or sk 270 is derived from both k 240 and r 250. In other words, the session key, sk 270, is divided between the signaling layer 210 and the media layer 220. The sk 270 is used to immediately encrypt the media. Sk 270 is the PRP F evaluated with k 240 on r 250. Sk 270 is defined by $sk=F_k(r)$, where F is a pseudorandom function having a determinable range and domain. For example, where F is chosen to be an AES function, the domains of k and r can be $k, r \in \{0,1\}^{128}$. In accordance with the key management system described herein, a reasonably high level of security is achieved in a simple and cost-effective manner, since an adversary may observe r but not k and will not be able to distinguish sk from a random string of the same length, as Fk is a permutation that when applied to a random input produces a random output. Similarly, an SIP proxy could observe k, but does not have access to media streams to observe r. Thus, even active adversaries succeed in only limited scenarios.

Further, the system herein eliminates the need to employ PKI infrastructure by adding layers without the complications and costs of PKI. The system provides good security levels to ensure privacy with minimal costs, reduces trust assumptions on the SIP servers, and prevents instances of the second terminal 260 sharing the session key due to forking. The system and method herein achieve reasonable security at $1/100^{th}$ of the cost of other keying protocols, such as DTLS-SRPT.

Thus, a key management system and method that incorporates multiple layers to produce a random session key via queries within the layers provides a simple, cost-effective and highly secure key management system in accordance with the principles herein. Further, the system is suitable for use in SIP. An additional advantage is achieved with this interactive key management system in that forking does not occur in different instances of Bob communicating with the same k, since a random r will be generated each time Bob uses k. Further, Alice and Bob can establish a long-term PSK to establish a more efficient and secure key exchange in future sessions.

Figure 3:
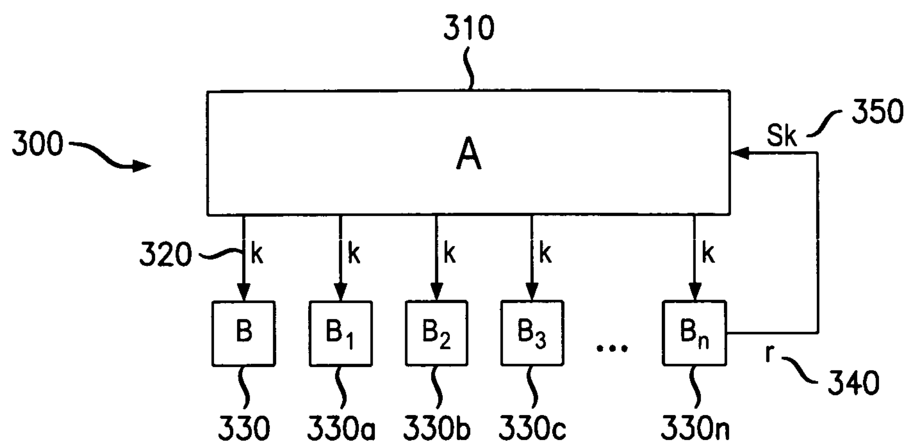
FIG. 3 is a block diagram depicting an exemplary arrangement 300 of a system constructed in accordance with the principles of the present invention.

The general arrangement and functions of another exemplary system 300 now be described with reference to FIG. 3. These elements of exemplary system 300 are preferably interconnected, and preferably function as in known networks, with exceptions and enhancements noted herein. A system 300 includes a first terminal 310. User A employs a first terminal 310 to send a selected key k 320 via a signaling layer to a second terminal 330, and to other alternate terminals 330*a*, 330*b*, 330*c*, . . . 330*n* having a routing identifier known by A for B. B can respond to A using device 330*n* by generating r 340 with 330*n* and transmitting r 340 to the first terminal 310 via a media layer along with k 320 to produce a session key sk 350. In this embodiment, B may select, for example, an alternate device, such as alternate terminal 330*n* because it has operating characteristics desired for the session with A, such as video features, or any other feature desired that the B 330 device may not have. Alternatively, the B 330 device may have been lost or broken, in which case B may select Bn to facilitate the session due to necessity.

Figure 4:
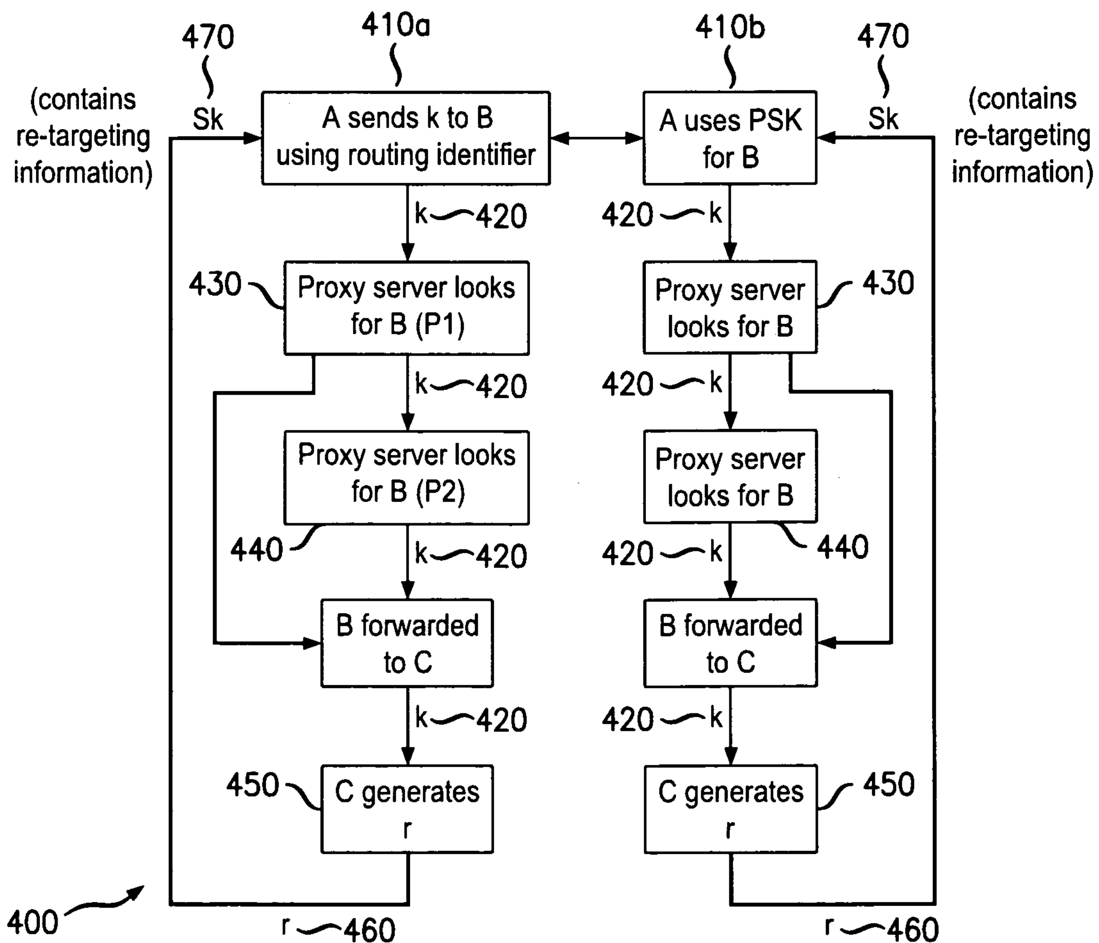
FIG. 4 is a diagram depicting another exemplary arrangement 400 of a system constructed in accordance with the principles of the present invention.

In yet another exemplary embodiment illustrated in FIG. 4, A can determine if B has forwarded his communications to an alternate terminal C when a session key sk arrives by viewing the routing identifier information from C for the session key sk. Specifically, another exemplary arrangement 400 of a system constructed in accordance with the principles of the present invention includes a first terminal 410*a* or 410*b*. Specifically, a key k 420 is generated by the first terminal 410*a* if a routing identifier for B is used, and by 410*b* if a long-term PSK for B is used. K 420 is then forwarded to a first proxy server P1 430 to look for B. P1 430 can either find B directly, or continue to forward the query to at least one additional proxy server, such as P2 440. Since B has forwarded his routing identifier to C, k 420 is forwarded to C 450. C now generates r 460, and transmits r 460 to A along a media layer with k 420 to form sk 470. Sk 470 can contain the routing identifier information transmitted with r, which can be used to notify A that B has re-targeted his routing identifier to C 450. This information provides yet another security layer for the system.

An exemplary method of securing a communication system can include the steps of providing a routing device for identifying a subscriber; and providing a master key exchange session, the master key exchange session including a key k to find a subscriber and a nonce r to answer a query to the subscriber, wherein the master key exchange session includes both the key k and the nonce r.

The method can be further defined wherein the key k is sent over a SIP network.

The method can be even further defined wherein the nonce r is sent by the subscriber over a media channel. The media channel of the method can be an Internet media channel. In accordance with the method, the system is further defined by $sk=F_k(r)$, where F is a pseudorandom function. F can also be an AES function, wherein the domains of k and r are defined by $k, r \in \{0,1\}^{128}$. An exemplary system having a secure session key can include a first device for transmitting a random key k over an SIP framework; and a second device for receiving the random key k, the second device selecting a random nonce r and transmitting the random nonce r in plaintext over a media layer to the first device.

Yet another system for generating a secure session key can include a first communication device for generating a signaling key packet; a second communication device for generating a media key packet; and wherein the signaling key packet is sent to the second communication device over a signaling layer and the media key packet is sent to the first communication device over a media layer.

The present application relates to an efficient key management system and method, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the telecommunications arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

However, one of skill in the art will appreciate that the teachings of the present application could be applied to other types of wireless networks (perhaps with modifications within the ken of a skilled artisan) without departing from the spirit of the present invention.

Specifically, a novel system and method of key exchange with minimal costs could be provided in a variety of communication environments without departing from the spirit of the invention. For instance, the steps may be performed in a differing order, or steps may be added, deleted, or modified. Further, signaling and media layers could be bound to an internal subscriber network without departing from the principles described herein.

The embodiments described herein are exemplary. Thus it will be appreciated that although the embodiments are described in terms of specific technologies, other equivalent technologies could be used to implement systems in keeping with the spirit of the present invention.

The method set forth herein can include computer readable storage medium storing instructions which, when executed on a programmed processor achieve the novel keying protocol.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An efficient key exchange system comprising: a first terminal adapted and constructed to receive a random key k generated and selectively transmitted from a second terminal via a signaling layer, wherein upon receipt of the random key k by the first terminal, the first terminal generates and selectively transmits a random nonce r via a media layer to the second terminal, so as to derive a session key that is divided between the signaling layer and the media layer.

2. The efficient key exchange system of claim 1 wherein a session key sk is derived from the random key k and from the random nonce r is further defined by $sk=F_k(r)$, where F is a pseudorandom function.

3. The efficient key exchange system of claim 2 wherein F is an Advanced Encryption Standard (AES) function, and wherein the domains of the random key k and of the random nonce r are defined by $k, r \in \{0,1\}^{128}$.

4. The efficient key exchange system of claim 1, wherein the random nonce r is transmitted from the first terminal to the second terminal using plaintext.

5. The efficient key exchange system of claim 1, wherein the first terminal and the second terminal exchange a long-term Pre-Shared Key (PSK).

6. The efficient key exchange system of claim 2, wherein the problem of forking is eliminated from the key exchange by the addition of the random nonce r to the definition of a session key.

7. The efficient key exchange system of claim 1, wherein key derivation is complete when the second terminal receives the random nonce r.

8. At least one first device for providing cost effective, secure key exchange; and at least one proxy server, wherein the at least one first device generates and selectively transmits a first key, including a random key k, to at least one second device via the at least one proxy server, wherein the at least one first device receives via a media stream of the Internet a second key generated and selectively transmitted by the at least one second device upon receipt of the first key, so as to derive a session key that is divided between the proxy server and the media stream.

9. The at least one first device of claim 8, wherein the key k is the first key exchange message, and wherein the key k is transmitted via an SIP signaling stream to the at least one second device.

10. The at least one first device of claim 8, wherein a nonce r is the second key exchange message, and wherein the nonce r is transmitted via the media stream to the at least one first device.

11. At least one first device for providing cost effective, secure key exchange configured to send a signal and to receive a signal; and at least one proxy server, wherein the at least one first device selectively transmits a first key, including a random key k that is not a session key, to at least one second device via the at least one non-secure proxy server, and wherein the at least one first device receives via a media stream of the Internet a second key generated and selectively transmitted by the at least one second device upon receipt of the first key, wherein a nonce r is the second key exchange message, and wherein the nonce r is transmitted via the media stream to the at least one first device, wherein the key k remains constant for all forked branches in the SIP signaling stream, and wherein each branch contributes a unique nonce r, thus preventing key leakage to parties not part of the session due to the forking problem.

12. A method for operating a system comprising the steps of:

receiving, by a first device, a routing identifier for the first device and for a second device;

generating, by the first device, a first key that is not a session key sk;

selectively transmitting, by the first device, the first key to the second device via a proxy server using the routing identifier for the second device;

receiving, by the first device, using a media layer of the Internet, a second key generated and selectively transmitted by the second device, so as to derive the session key sk that is divided between the proxy server and the media layer.

13. The method of claim 12 wherein the second key is further defined by a nonce r.

14. The method of claim 13, wherein the nonce r is transmitted from the second device to the first device using plaintext.

15. The efficient key exchange system of claim 1, wherein the media layer is non-secure.

16. The at least one first device of claim 8, wherein the media stream of the Internet is non-secure.

17. The method of claim 12, wherein the media layer of the Internet is non-secure.

18. A method for operating a system comprising the steps of:

receiving, by a first device, a routing identifier for the first device and for a second device;

receiving, by the first device, a first key generated and selectively transmitted via a proxy server from a second device using the routing identifier for the first device, wherein the first key is not a session key sk;

generating, by the first device, upon receipt of the first key by the at least one first device, a second key;

selectively transmitting, by the first device to the second device, using a media layer of the Internet, the second key, so as to derive the session key sk that is divided between the proxy server and the media layer.

19. The method of claim 18, wherein the media layer is non-secure.

20. An article, comprising:

one or more non-transitory computer-readable media;

means in the one or more media for receiving, by a first device, a routing identifier for the first device and for a second device;

means in the one or more media for receiving, by the first device, a first key generated and selectively transmitted via a media layer of the Internet from a second device using the routing identifier for the first device, wherein the first key is not a session key sk;

means in the one or more media for generating and selectively transmitting, by the first device to the second device, upon receipt of the first key by the at least one first device, using a media stream of the Internet, a second key, so as to derive the session key sk that is divided between the media layer and the media stream.

21. The article of claim 20, wherein the media stream is non-secure.

* * * * *